(12) United States Patent
Lu et al.

(10) Patent No.: US 6,633,371 B1
(45) Date of Patent: Oct. 14, 2003

(54) OPTICAL PERFORMANCE MONITORS

(75) Inventors: Tongxin Lu, San Jose, CA (US); Zheng Yan, San Jose, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days.

(21) Appl. No.: 10/185,539

(22) Filed: Jun. 26, 2002

Related U.S. Application Data

(60) Provisional application No. 60/327,909, filed on Oct. 9, 2001.

(51) Int. Cl.[7] ............................................. G01N 21/00
(52) U.S. Cl. .................................................. 356/72
(58) Field of Search ........................ 356/72, 213, 218, 356/219, 221, 222, 224; 358/110, 124; 385/15, 24, 27, 39; 398/25, 34

(56) References Cited

U.S. PATENT DOCUMENTS

| | | |
|---|---|---|
| 5,838,437 A | 11/1998 | Miller et al. |
| 6,097,487 A * | 8/2000 | Kringlebotn et al. ....... 356/450 |
| 6,396,051 B1 * | 5/2002 | Li et al. ................ 250/227.18 |
| 2002/0164125 A1 * | 11/2002 | Berger et al. .................. 385/39 |
| 2003/0035163 A1 * | 2/2003 | Althouse et al. ............ 359/110 |
| 2003/0113114 * | 6/2003 | Blazo .......................... 398/25 |

FOREIGN PATENT DOCUMENTS

WO      WO 00/13350      3/2000

* cited by examiner

*Primary Examiner*—Michael P. Stafira
(74) *Attorney, Agent, or Firm*—Joe Zheng; C. P. Chang; Pacific Law Group, LLP

(57) ABSTRACT

Method and apparatus for wavelength control and measurement are disclosed. An optical signal to be measured is tapped off a portion thereof referring to as a source signal. Together with a reference signal, the source signal is coupled to a tunable filter. The frequency response or passing band of the tunable filter is so controlled that one wavelength $\lambda_x$ from the source signal and one wavelength $\lambda_{rx}$ from the reference signal transmit through. Relying on a band separation filter, the wavelength $\lambda_{rx}$ is separated from the reference signal and coupled to a gas cell of a known spectrum, a filtered signal of the wavelength $\lambda_{rx}$ is then coupled to a photo-detector for subsequent electrical measurement. In accordance with the known spectrum, the wavelength $\lambda_x$ can be precisely derived.

15 Claims, 4 Drawing Sheets

OPTICAL PERFORMANCE MONITORS

CROSS-REFERENCE TO RELATED APPLICATION

This application claims the benefits of U.S. provisional application No.: 60/327,909, and entitled "Optical performance monitor with tunable filter and simultaneous gas cell wavelength reference," filed on Oct. 9, 2001, which is hereby incorporated by reference for all purposes.

BACKGROUND OF THE INVENTION

1. Field of the Invention

The present invention is related to the area of optical instruments and, in particular, related to an optical performance monitor for precise wavelength, power and signal-to-noise ratio measurement.

2. Description of Related Art

The future communication networks demand ever increasing bandwidths and flexibility to different communication protocols. DWDM (Dense Wavelength Division Multiplexing) is one of the key technologies for such optical fiber communication networks. DWDM employs multiple wavelengths or channels in a single fiber to transmit in parallel different communication protocols and bit rates. Transmitting several channels in a single optical fiber at different wavelengths can multi-fold expand the transmission capacity of the existing optical transmission systems, and facilitating many functions in optical networking.

Optical telecommunications generally involves the use of light beams propagating through optical networks to transmit data from one end to another end. If there are any deficiency in the optical networks (e.g., fibers or switches), the quality or parameters of the light beams will be degraded. Thus monitoring the performance of optical networks is important in optical communications.

The performance of a DWDM optical communication network can be monitored by measuring the wavelengths, powers and signal-to-noise ratios of its channels in real-time. Diffraction grating and tunable filters are most commonly used techniques for DWDM network performance monitoring. Wavelength references are usually used to remove wavelength uncertainties associated with tunable filters. Fabry-Perot tunable filters with different wavelength reference techniques have been used in the past (e.g., see U.S. Pat. No. : 5,838,437). With tunable filters, it is potentially to obtain finer wavelength resolutions and to have tapped signals for Bit-Error-Rate Test (BERT).

Because of uncertainties of mechanical scanning, real-time wavelength calibrations are commonly used to ensure the wavelength accuracy. Usually, optical-mechanical switches are used to switch back and forth between the optical signal channels under monitoring and the optical wavelength reference channel for referencing. Wavelength reference techniques can be a series of Fiber Bragg Grating (FBG) filters or a slope filter. Gas cell wavelength references have also been used for DWDM applications. In those applications, gas cells covering the same wavelength as the communication signal channel wavelengths are often used (e.g., see Duwayne Anderson, et al, "Real-time wavelength calibration with picometer accuracy in swept-laser system," Technical Proceedings, NFOEC 2001, Vol. 2, 1089–1100, 2001).

New techniques for simple and accurate determination of wavelength(s) in optical signals are still desirable in the field.

SUMMARY OF THE INVENTION

The present invention pertains to method and apparatus for wavelength control and measurement. In one aspect of the present invention, an optical signal to be measured is tapped off a portion referring to as a source signal. Together with a reference signal, the source signal is coupled to a tunable filter. The passing bands of the tunable filter is so controlled that one wavelength $\lambda_x$ from the source signal and one wavelength $\lambda_{rx}$ from the reference signal transmit through. Relying on a band separation filter, the wavelength $\lambda_{rx}$ is separated from the source signal and then coupled to a gas cell of a known spectrum, a filtered signal of the wavelength $\lambda_{rx}$ is then coupled to a photo-detector for subsequent electrical measurement.

Because the intensities of the source signal and the reference wavelength absorbed by the gas in the gas cell are sampled simultaneously, the wavelength $\lambda_x$ of the source signal can be calculated accordingly from mapping the sampled gas absorption spectrum at the same time interval. The relationship is a one-to-one mapping between two different Free Space Ranges (FSR) and can be uniquely defined by the properties of the tunable filter. As a result, wavelength, power, and signal-to-noise ratio in an optical system (e.g., a DWDM system) can be precisely determined.

One of the objects in the present invention is to provide a new technique for wavelength control and measurement with a tunable filter and a gas cell filter.

Other objects, features, and advantages of the present invention will become apparent upon examining the following detailed description of an embodiment thereof, taken in conjunction with the attached drawings

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

The present invention pertains to method and apparatus for wavelength control and measurement. In one aspect of the present invention, an optical signal to be measured is tapped off a portion referring to as a source signal. Together with a reference signal, the source signal is coupled to a tunable filter. The pass-bands of the tunable filter is so controlled that one wavelength $\lambda_x$ from the source signal and one wavelength $\lambda_{rx}$ from the reference signal transmit through. Relying on a band separation filter, the wavelength $\lambda_{rx}$ is separated from the source signal and coupled to a gas cell of a known spectrum, a filtered signal of the wavelength $\lambda_{rx}$ is then coupled to a photo-detector for subsequent electrical measurement. Subsequently, in accordance with the known spectrum, the wavelength $\lambda_x$ can be precisely derived through a predetermined scheme. There are many benefits, advantages and features in the present invention. One of them is the precision a simple measurement system contemplated in the present invention can offer. Another one of them is the use of a tunable filter together with a gas cell, based on the characteristics thereof, a wavelength in the source signal can be precisely determined. Other benefits, advantages and features can be appreciated from the description herein.

The detailed description of the present invention is presented largely in terms of procedures, steps, logic blocks, processing, or other symbolic representations that directly or indirectly resemble the operations of optical devices or systems coupled to optical networks. These process descriptions and representations are typically used by those skilled in the art to most effectively convey the substance of their work to others skilled in the art. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
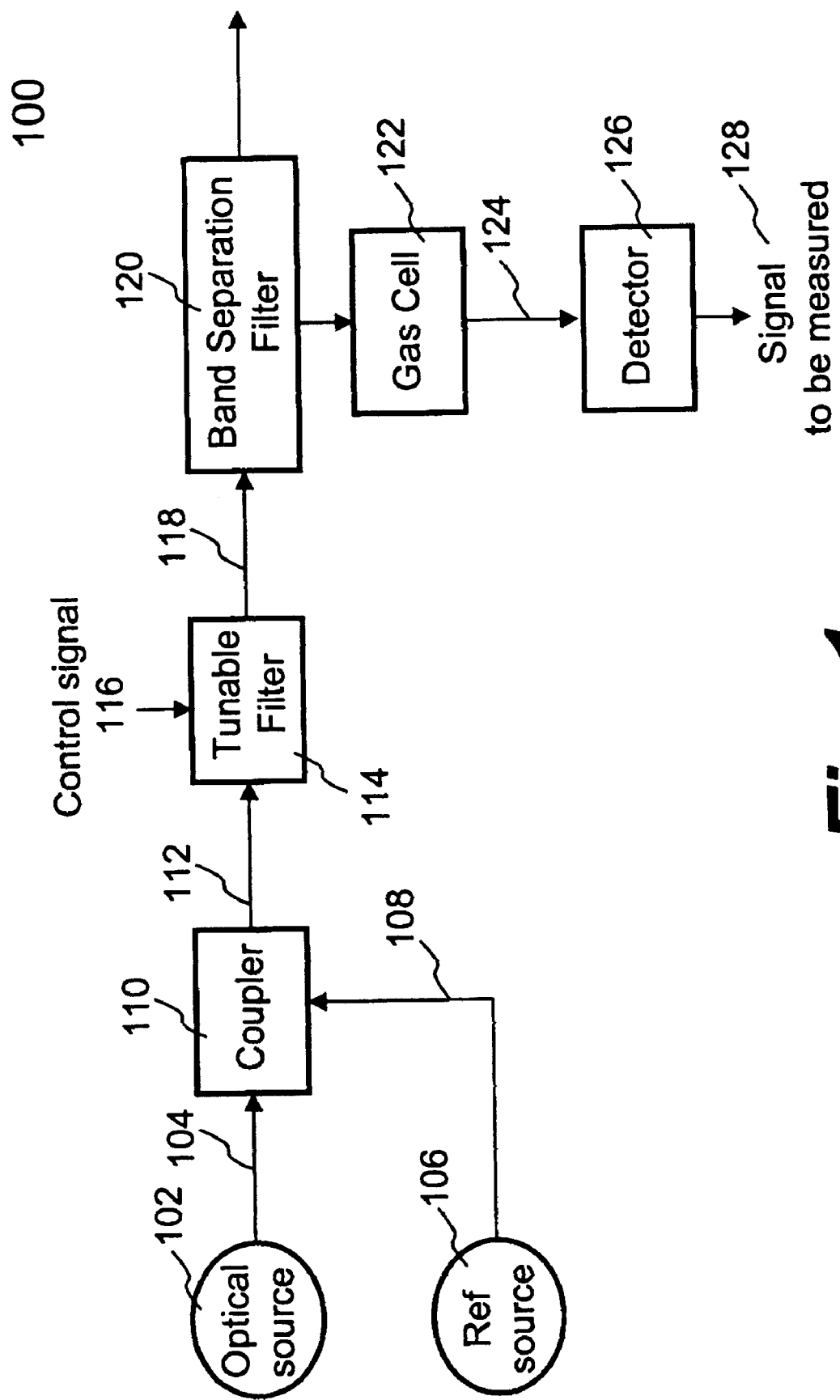
FIG. 1 shows a functional block diagram of a measurement system according to one embodiment of the present invention.

Referring now to the drawings, in which like numerals refer to like parts throughout the several views. FIG. 1 illustrates a functional block diagram 100 of a measurement system according to one embodiment of the present invention. The optical source 102 is a port of an optical device from which a portion 104 of an optical signal can be sampled. According to one embodiment, the optical signal is a DWDM (Dense Wavelength Division Multiplexing) optical signal including multiplexed N channel signals having wavelengths at $\lambda_1, \lambda_2, \ldots, \lambda_N$. The sampled signal 104 is typically tapped out 1~5% of the optical signal by a coupler (not shown) and referred hereinafter as a source signal.

A broadband source 106 produces a broadband reference signal 108. Both the source signal 104 and the reference signal 108 are coupled to a coupler 110 that outputs a combined signal 112. The combined signal 112 is then coupled to a tunable filter 114. Depending on implementation, the tunable filter 114 may be a tunable Fiber Bragg Grating (FBG), a Fabry-Perot tunable filter, or an optical device with tunable wavelength selectivity. In any case, the tunable filter 114 is applied a control signal 116 to achieve the wavelength selectivity.

Figure 2:
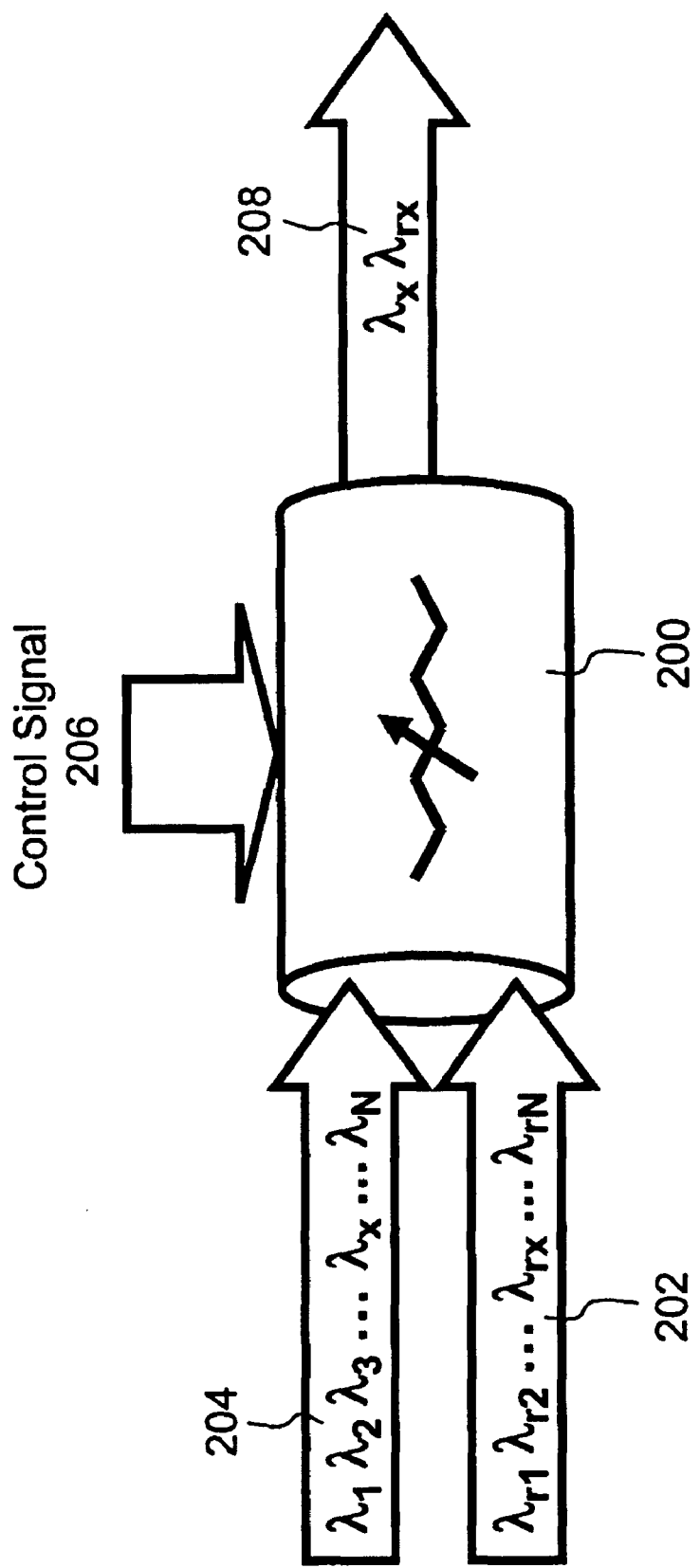
FIG. 2 shows an illustration in which a tunable filter is being controlled by or through an adjustable control signal.

By virtue of the present invention, the tunable filter 114 is so controlled that the output thereof includes at least two wavelengths, one from the source signal 104 and the other one from the reference signal 108. FIG. 2 shows an illustration in which the tunable filter 200 is being controlled by an adjustable control signal 206. The tunable filter 200 receives two multiplexed signals 202 and 204 and has a spectrum response in accordance with the control signal 206 such that the output of the tunable filter 200 has at least one wavelength $\lambda_x$ from the signal 204 and $\lambda_{rx}$ from the signal 202.

According to one embodiment, the tunable filter 200 is a Fabry-Perot tunable filter. It is known that the transmittance of the filter is:

$T=1/(1+4R \sin^2(\theta/2)/(1-R)^2)$ where $\theta=4\pi nl/\lambda$, R is the reflectance of mirrors of the cavity in the Fabry-Perot tunable filter, n is the refractive index of the cavity, l is the cavity length. In operation, the filter's cavity length can be controlled by a voltage applied to a piezo transducer (PZT) or microelectromechanical systems (MEMS). When $\theta=2m\pi$, m is an integer, $m\lambda=2nl$, the transmittance reaches the maximum value. A number of transmission peaks at $\lambda=2nl/m$ can exist simultaneously. The frequency range between any nearest coexisting transmission peaks is defined as Free Spectral Range (FSR)

$FSR=c/2nl$

If the FSR of the tunable filter 200 is selected correctly, the light from the source signal 204 and the reference signal 202 at other wavelength range can pass through simultaneously without interference.

Returning to FIG. 1, the two wavelengths 118 are coupled to a band separation filter 120 that separates the two wavelengths 118 apart. Essentially, the filtered signal from the source goes directly to a power detector or a Bit-Error-Rate-Test (BERT) device, and the filtered signal (wavelength $\lambda_{rx}$) is coupled to a gas cell 122 of a known spectrum response. A filtered output 124 from the gas cell 122 is then coupled to a detector 126. Typically, being a photodetector, the detector 126 produces an electronic signal 128 of the filtered wavelength $\lambda_{rx}$. The electronic signal 128 can now be measured. A computation can be conducted to derive the wavelength $\lambda_{rx}$. Because the intensities of the DWDM signal and the reference wavelength absorbed by the gas in the gas cell 122 are sampled simultaneously, the wavelength $\lambda_x$ of the source 104 from the DWDM signal can be calculated accordingly from mapping the sampled gas absorption spectrum at the same time interval. The relationship is a one-to-one mapping between two different FSR's and can be uniquely defined by the properties of the tunable filter. As a result, the wavelength $\lambda_x$ can be precisely determined.

Results

In an exemplary implementation of the present invention, the source signal 102 has wavelengths from 1530 nm to 1562 nm and the reference signal 104 has wavelengths from 1625 nm to 1662 nm. The absorption spectrum of a Methane ($CH_4$) gas cell at 1627 nm to 1695 nm wavelength range and 1312 nm to 1345 nm wavelength range are used and may be referred to in Kinpui Chan, Hiromasa Ito, and Humio Inaba, "Remote sensing system for near-infrared differential absorption of $CH_4$ gas using low-loss optical fiber link," Applied Optics Vol. 23, 3415–3420 (1984), and "Absorption measurement of $v_2+2v_3$ band of $CH_4$ at 1.33 μm using an InGaAsP light emitting diode," Applied Optics Vol. 22, 3802–3804 (1983), both are hereby incorporated by reference. Thus both of the $CH_4$ absorption ranges are out of commonly used DWDM spectrum ranges while applicable to the reference source. However, the 1600 nm range has deeper absorption peaks and closer to DWDM C-band and L-band.

Figure 3:
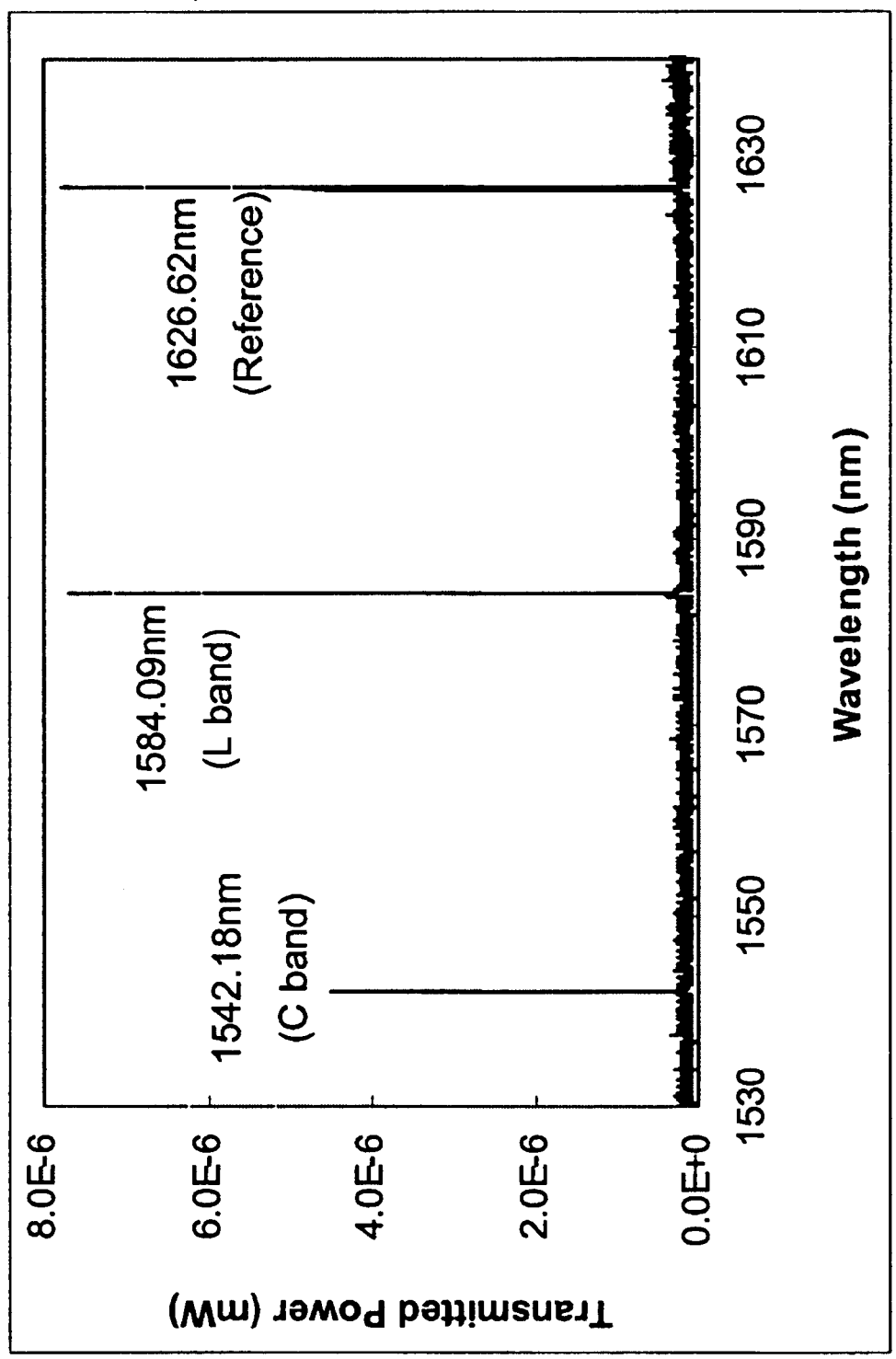
FIG. 3 shows three transmission peaks of a Fabry-Perot tunable filter of Micron Optics where C-band, L-band and reference spectrum are scanned simultaneously.

Referring to FIG. 3, it shows three transmission peaks of a Fabry-Perot tunable filter of Micron Optics (located at 1852 Century Place NE, Atlanta, Ga. 30345 USA), where C-band, L-band and reference spectrum are scanned simultaneously. At a particular cavity position, the transmitted peaks are 1542.18 nm of C-band, 1584.09 nm of L-band, and 1626.62 nm of $CH_4$ gas cell reference wavelength. Since the relationships among these peaks are uniquely determined by the FSR's of the tunable filter, the wavelengths in C- and L-band can be calculated by the wavelength measured in reference band with signal processing techniques.

Table below shows absorption peaks of $CH_4$ gas from 1625 nm to 1665 nm.

| λ (nm) | 1627.67 | 1630.09 | 1632.49 | 1635.02 | 1637.26 | 1639.96 | 1642.50 |
|---|---|---|---|---|---|---|---|
| λ (nm) | 1645.15 | 1647.82 | 1650.54 | 1653.32 | 1656.12 | 1659.00 | 1661.91 |

The measurement data are taken from Burleigh's WA-7600 Wavemeter. The accuracy of the measurement is ±8 pm.

Figure 4:
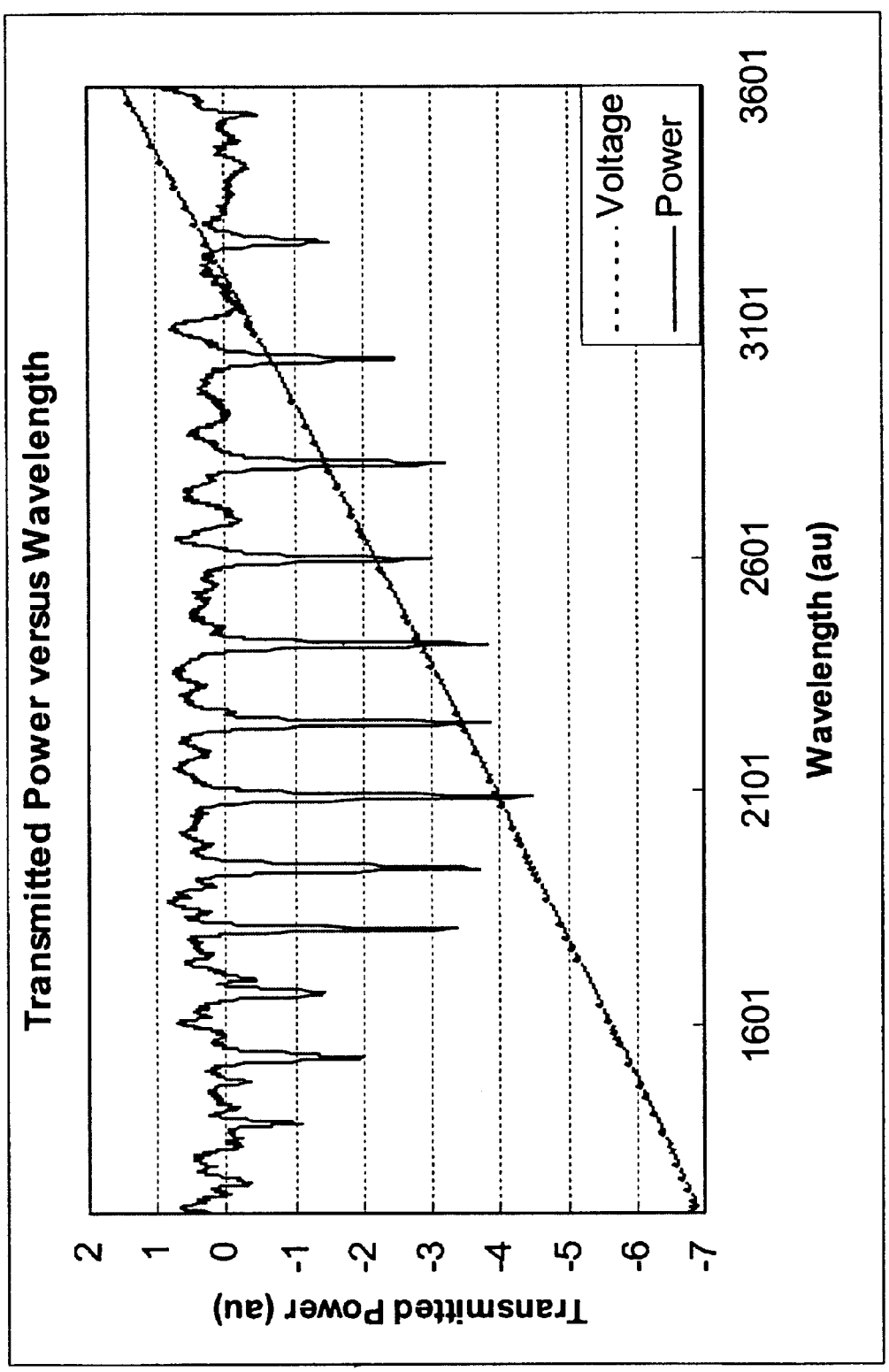
FIG. 4 shows that output optical powers as a curve of an Optical signal passing a $CH_4$ gas cell versus wavelength, it also shows that a corresponding scanning voltage applied to a tunable filter, the actual wavelength range is from 1625 nm to 1665 nm approximately.

FIG. 4 shows output optical powers of a $CH_4$ gas cell obtained by tuning the Fabry-Perot filter. This gas cell is a product of Wavelength-References. Each dip corresponds to one of the absorption peaks. The straight line is the applied scanning voltage to the filter. The relationship between the wavelength and its scanning voltage is not linear in general. However, the nonlinearity can be corrected with calibrations and signal processing algorithms. Typically, the signal processing algorithms involve solving for polynomials or correlations, which is well known to those skilled in the art.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

We claim:

1. An optical measurement system comprising:
   a coupler receiving a source signal and a reference signal and producing a combined signal;
   a tunable filter receiving the combined signal, the tunable filter being so controlled that the tunable filter outputs one wavelength $\lambda_x$ from the source signal and one wavelength $\lambda_{rx}$ from the reference signal;
   a band separation filter coupled to the tunable filter to separate the wavelength $\lambda_{rx}$ from the wavelength $\lambda_x$; and
   a gas cell of a known frequency response receiving the wavelength $\lambda_{rx}$ and producing a filtered signal to be electrically measured so that the wavelength $\lambda_x$ can be derived.

2. The optical measurement system of claim 1, wherein the source signal is a small portion of an optical signal in an optical system.

3. The optical measurement system of claim 2, wherein the source signal is tapped off from the optical signal by a tapping coupler.

4. The optical measurement system of claim 1, wherein the tunable filter is an optical device with tunable wavelength selectivity.

5. The optical measurement system of claim 1, wherein the tunable filter is a tunable filter whose cavity length is so controlled by a voltage applied to a piezo transducer (PZT) that a frequency range between any nearest coexisting transmission peaks permits that the wavelength $\lambda_{rx}$ and the wavelength $\lambda_x$ can pass through simultaneously without interference.

6. The optical measurement system of claim 5, wherein the known spectrum of the gas cell has absorption ranges beyond spectrum ranges of the source signal.

7. The optical measurement system of claim 6, wherein a relationship between peaks at the wavelength $\lambda_{rx}$ and the wavelength $\lambda_x$ after filtered by the tunable filter is uniquely determined by free space ranges (FSR) of the tunable filter.

8. A method for an optical measurement system, the method comprising:
   receiving a source signal and a reference signal;
   combining the source signal and the reference signal to produce a combined signal;
   filtering the combined signal by a tunable filter, wherein the tunable filter is so controlled that the tunable filter outputs one wavelength $\lambda_x$ from the source signal and one wavelength $\lambda_{rx}$ from the reference signal;
   separating the wavelength $\lambda_{rx}$ from the wavelength $\lambda_x$;
   coupling the wavelength $\lambda_x$ to a gas cell of a known frequency response; and
   producing a filtered signal to be electrically measured so that the wavelength $\lambda_x$ is to be calculated.

9. The method of claim 8, wherein the source signal is a small portion of an optical signal in an optical system.

10. The method of claim 8, wherein the source signal is tapped off from the optical signal by a tapping coupler.

11. The method of claim 8, wherein the tunable filter is an optical device with tunable wavelength selectivity.

12. The method of claim 8, wherein the tunable filter is a Fabry-Perot tunable filter whose cavity length is so controlled by a voltage applied to a piezo transducer (PZT) that a frequency range between any nearest coexisting transmission peaks permits that the wavelength $\lambda_{rx}$ and the wavelength $\lambda_x$ can pass through simultaneously without interference.

13. The method of claim 12, wherein the known spectrum of the gas cell has absorption ranges beyond spectrum ranges of the source signal.

14. The method of claim 13, wherein a relationship between peaks at the wavelength $\lambda_{rx}$ and the wavelength $\lambda_x$ after filtered by the tunable filter is uniquely determined by free space ranges (FSR) of the tunable filter.

15. The method of claim 9, wherein the optical system is a DWDM (Dense Wavelength Division Multiplexing) optical network.

* * * * *